(12) United States Patent
Oh et al.

(10) Patent No.: US 6,649,301 B1
(45) Date of Patent: Nov. 18, 2003

(54) SEALED BATTERY

(75) Inventors: Wan-Seog Oh, Chungchongnam-do (KR); Sang-Won Lee, Chungchongnam-do (KR); Soo-Min Park, Chungchongnam-do (KR); Eung-Kil Choi, Chungchongnam-do (KR)

(73) Assignee: Samsung SDI Co., Ltd., Kyonggi-do (KR)

( * ) Notice: Subject to any disclaimer, the term of this patent is extended or adjusted under 35 U.S.C. 154(b) by 114 days.

(21) Appl. No.: 09/619,903

(22) Filed: Jul. 19, 2000

(30) Foreign Application Priority Data

Nov. 2, 1999 (KR) .......................... 1999-48132

(51) Int. Cl.[7] .............................. H01M 2/12
(52) U.S. Cl. ........................................ 429/56
(58) Field of Search ...................... 429/53, 56

(56) References Cited

U.S. PATENT DOCUMENTS

| | | | |
|---|---|---|---|
| 4,943,497 A | 7/1990 | Oishi et al. ................... | 429/53 |
| 5,418,082 A | 5/1995 | Taki ............................. | 429/53 |
| 5,821,008 A * | 10/1998 | Harada et al. ................. | 429/56 |
| 5,853,912 A | 12/1998 | Naing ........................... | 429/61 |
| 6,180,279 B1 * | 1/2001 | Kinuta .......................... | 429/56 |

* cited by examiner

Primary Examiner—Bruce F. Bell
Assistant Examiner—Jonathan Crepeau
(74) Attorney, Agent, or Firm—Norris McLaughlin & Marcus

(57) ABSTRACT

A sealed battery includes a can for receiving an electric generator, a shape-variable plate crimped on an opening of the can, a gasket disposed between the can and the shape-variable plate, a fixing plate disposed under the shape-variable plate, an insulating member disposed between the shape-variable plate and the fixing plate, and a projection extending from the fixing plate and welded on the shape-variable plate. The projection is provided with a mechanically weak portion which is designed to be broken at an internal pressure lower than that for separating a welding portion of the projection and the shape-variable plate.

10 Claims, 6 Drawing Sheets

SEALED BATTERY

BACKGROUND OF THE INVENTION

1. Field of the Invention

The present invention relates to a battery and, more particularly, to a sealed battery which is designed to cut-off the flow of current and exhaust internal gas when an internal pressure is increased above an allowable level, and to prevent short-circuit when the battery is deformed by outer shock, thereby enhancing safety thereof.

2. Description of the Related Art

U.S. Pat. No. 4,943,497 discloses a cylindrical sealed battery having a safety device which is designed to cut-off the flow of a current when an internal pressure is increased above an allowable level.

That is, when the internal pressure of the battery is increased above an allowable level, an explosion-proof valve is deformed by the increased pressure so that an electrode lead welded on a projection of the explosion-proof valve is broken by a stripper, thereby cutting-off the flow of current to enhance the safety of the battery.

However, although the explosion-proof device is normally operated when the internal pressure is quickly increased, but not properly operated when the internal pressure is slowly increased since the electrode lead moves following the explosion-proof valve, deteriorating the safety of the battery.

U.S. Pat. No. 5,418,082 discloses another sealed battery having means for cutting-off the flow of a current.

The current cut-off means disclosed in the patent is designed such that a cut-off pressure is determined by a welding state between a projection of a safety valve and a metal plate. However, since the welding state is determined by various parameters such as energy, amplitude, welding pressure, welding time, welding material, etc., the welding state is not always the same.

As a result, the operation of the current cut-off means is not constant. In addition, a welding portion between the projection and the metal plate is oxidized or weakened as the time goes, the same is easily broken by outer force, resulting in the deterioration of the safety of the battery.

Furthermore, the projection of the safety valve is extended downward, the safety valve may urge a power generating member to contact a negative electrode when outer shock is applied to the battery, causing short-circuit.

SUMMARY OF THE INVENTION

Therefore, the present invention has been made in an effort to solve the above described problems.

It is an objective of the present invention to provide a sealed battery which is designed to cut-off the flow of current and exhaust internal gas when an internal pressure is increased above an allowable level, and to prevent short-circuit when the battery is deformed by outer shock, thereby enhancing safety thereof.

To achieve the above objective, the present invention provides a sealed battery comprising a can for receiving an electric generator, a shape-variable plate crimped on an opening of the can, a gasket disposed between the can and the shape-variable plate, a fixing plate disposed under the shape-variable plate, an insulating member disposed between the shape-variable plate and the fixing plate, and a projection extending from the fixing plate and welded on the shape-variable plate, the projection being provided with a mechanically weak portion which is designed to be broken at an internal pressure lower than that for separating a welding portion of the projection and the shape-variable plate.

A thickness of the mechanically weak portion is less than those of the shape-variable plate and the fixing plate.

The shape-variable plate is provided with a safety valve which is designed to be broken at an internal pressure higher than that for breaking the mechanically weak portion.

The shape-variable plate comprises two layers attached to each other, and a portion of one of the layer is omitted to define the safety valve.

The insulating member is fixed by a support ring.

An inner diameter of the gasket is less than an outer diameter of the fixing plate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
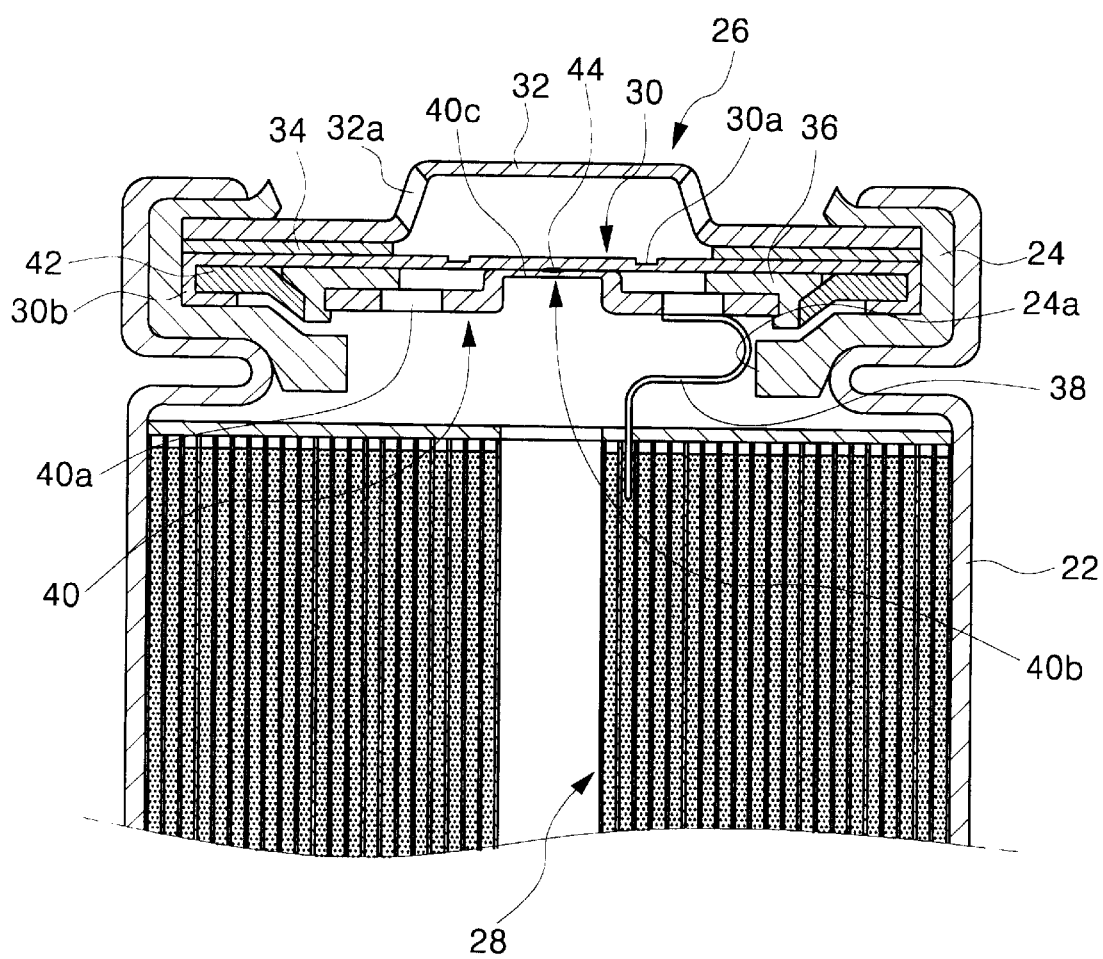
FIG. 1 is a sectional view of a sealed battery according to a preferred embodiment of the present invention.

FIG. 1 shows a sealed battery according to a preferred embodiment of the present invention.

A sealed battery of this embodiment comprises a can 22 and a cap assembly 26 close-tightly mounted on a top of the can 22 with a gasket 24 interposed therebetween.

An electric generator 28 having a positive electrode, a negative electrode, and a separator disposed between the positive and negative electrode is received within the can 22.

The cap assembly 26 includes a shape-variable plate 30 which is deformed in a direction where an internal pressure is applied. A cover cap 32 having an air-flow hole 32a is disposed on the shape-variable plate 30, and a current control member 34 may be further disposed between the cover cap 32 and the shape-variable plate 30.

An insulating member 36 is disposed under the shape-variable plate 30. A fixing plate 40 having an air-flow hole 40a is disposed under the insulator 36 and connected to a tap 38 extending from for example the positive electrode of the electric generator 28. Gas generated within the battery passes through the air-flow hole 40a of the fixing plate 40 and acts on a bottom surface of the shape-variable plate 30.

The insulating member 36 is down-skirted under the fixing plate 40 and is fixed by a support ring 42 disposed under the shape-variable plate 30. The support ring 42 is fixed by being crimped on an opening of the can 22 or by a bent portion 30b extending downward from the edge of the shape-variable plate 30.

Figure 2:
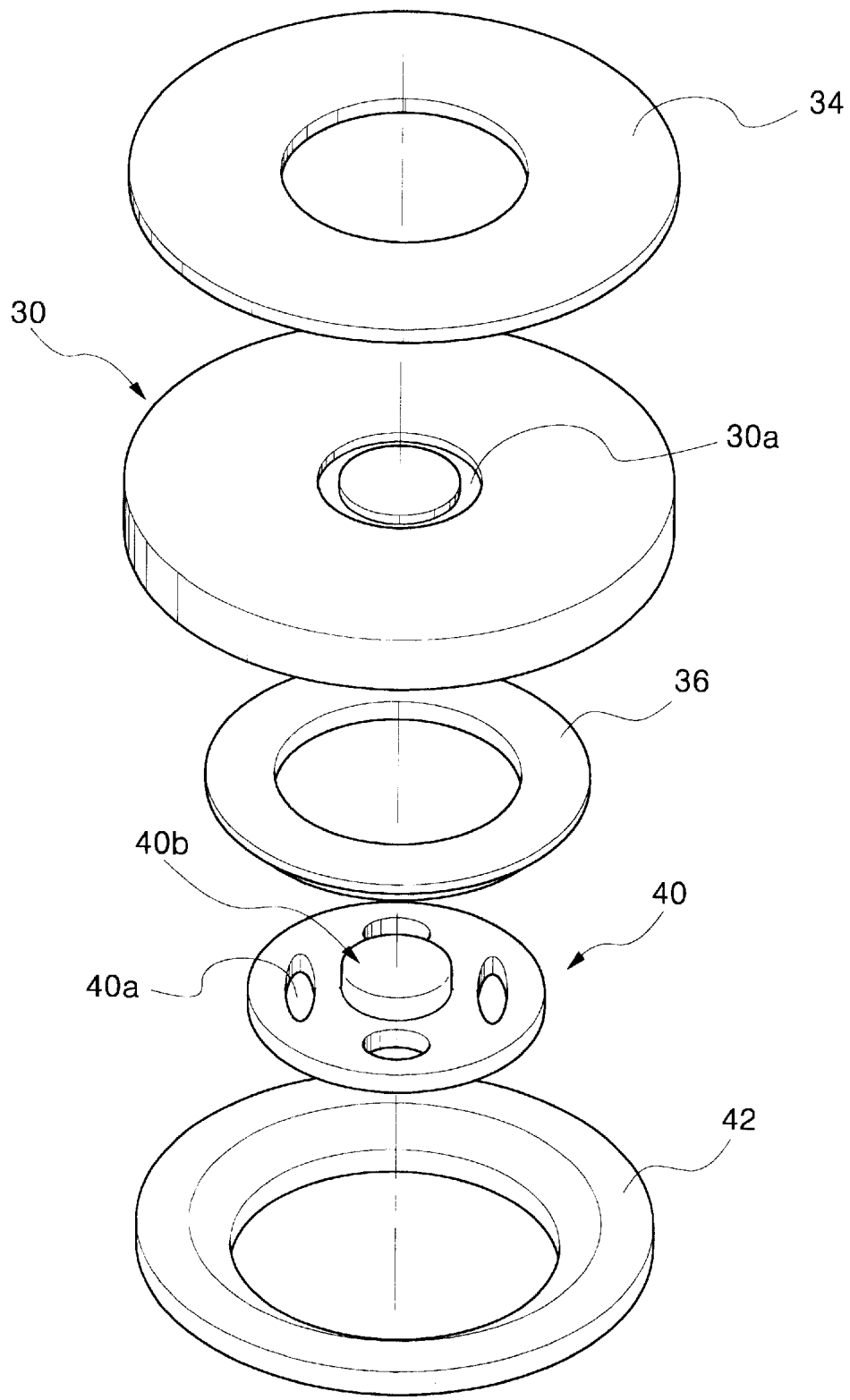
FIG. 2 is a perspective view illustrating major parts of a sealed battery according to a preferred embodiment of the present invention.

As shown in FIG. 2, the fixing plate 40 is provided with a projection 40b which is intensively attached on the bottom surface of the shape-variable plate 30 through for example a laser-welding process.

The projection 40b is provided with a mechanically weak portion 40c in the vicinity of a welding portion 44 which is designed to be broken when the shape-variable plate 30 is deformed. The thickness of the mechanically weak portion 40c is less than those of the shape-variable plate 30 and the fixing plate 40 so that, when an internal pressure of the battery is increased above an allowable level, it can primarily broken to cut-off the flow of the current. For the reliable operation, the mechanically weak portion 40c may be provided with a groove or a notch.

Describing more in detail, the mechanically weak portion 40c is designed such that it is broken at a pressure lower than that for breaking the welding portion 44.

As described above, since only one parameter of the mechanically weak portion 40c exists for cutting-off the current, it becomes easy to set the operation pressure.

Figure 3:
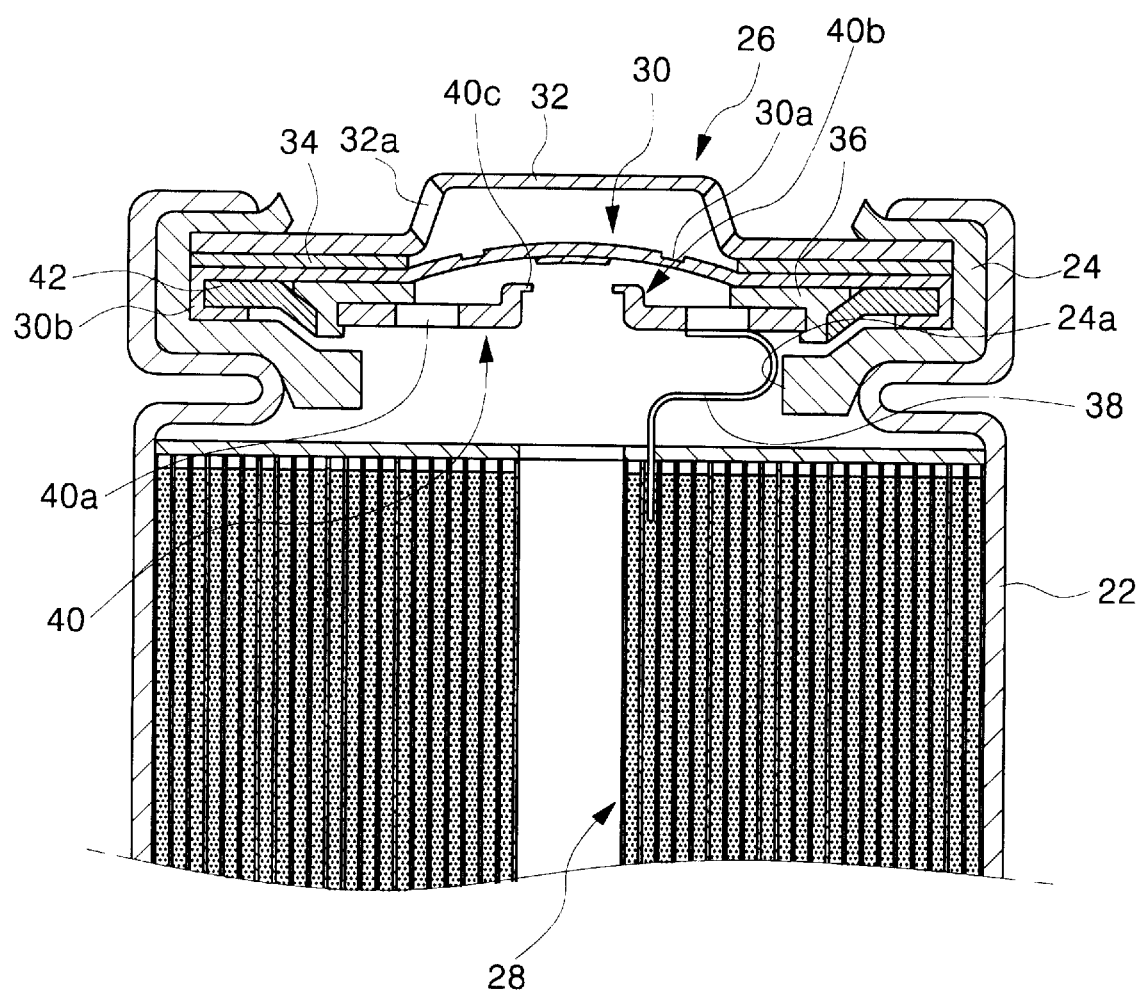
FIGS. 3 and 4 are sectional views illustrating the operation of a sealed battery according to a preferred embodiment of the present invention.

In operation, as shown in FIG. 3, when the internal pressure of the battery is increased above an allowable level, the shape-variable plate 30 is deformed upward by the increased internal pressure, and when the pressure is further increased to a level which can break the mechanically weak portion 40c, the mechanically weak portion 40c is broken as shown in the drawing, thereby cutting-off the flow of the current.

Preferably, the thickness of the mechanically weak portion 40c is designed to be broken at a pressure of 12~16 kgf/cm².

However, there may be possibility that the internal pressure is further increased by various reasons such as short-circuit even when the current is cut-off. Considering this, the present invention provides explosion-proof means for preventing the battery from is being exploded by making internal gas be exhausted outside.

The explosion-proof means comprises a safety valve 30a defined by a groove formed on the shape-variable plate 30. Preferably, the shape-variable plate 30 is formed by a dual-layer and the safety valve 30a is formed by a one-layer. That is, when layering a second layer on a first layer to make the shape-variable plate 30 using an electric forming process, a mask is used to prevent the second layer from being layered on a portion the first layer corresponding to the safety valve 30a.

This process has an advantage of providing an accurate thickness to the safety valve 30a, making it easy to set a broken pressure thereof.

Figure 4:
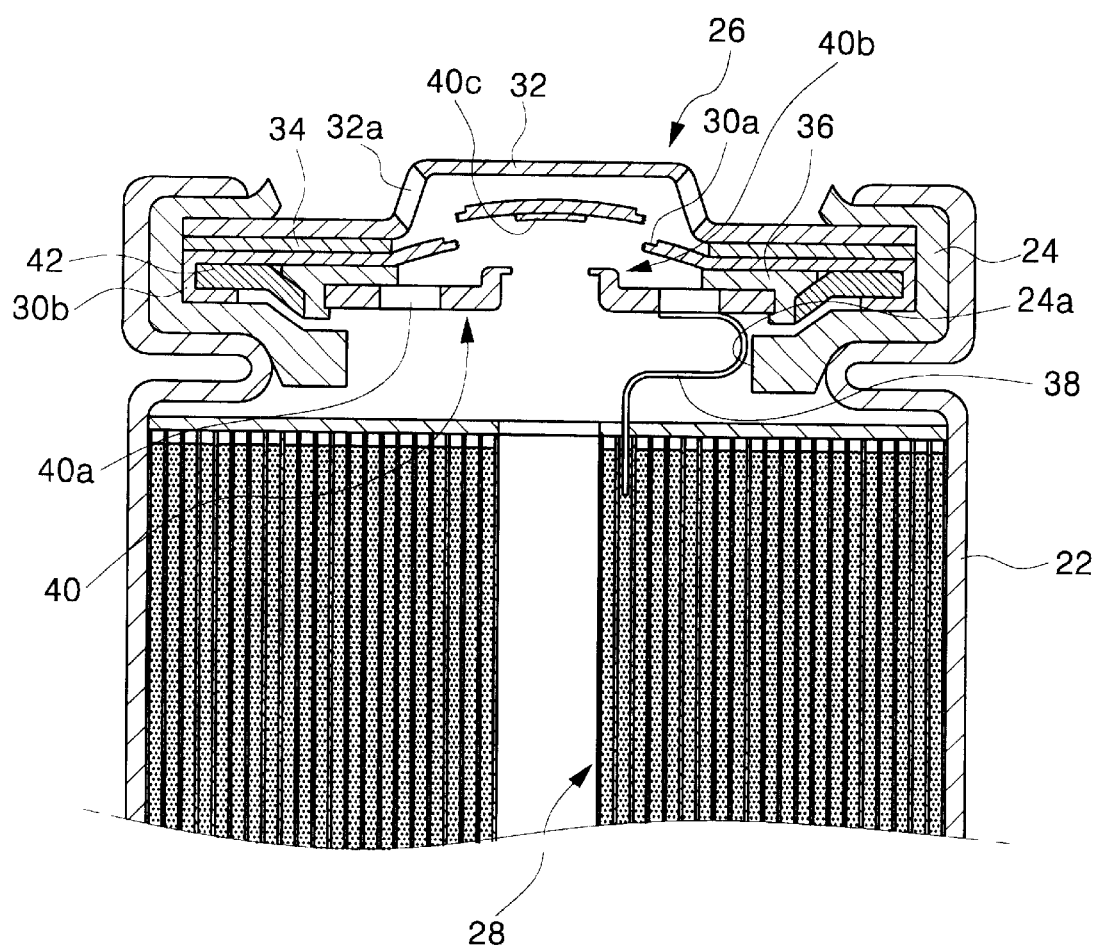

In operation, if the internal pressure is further increased even when the mechanically weak portion 40c is broken to cut-off the current, as shown in FIG. 4, the safety valve 30a is broken by the further increased pressure to exhaust the internal gas, thereby preventing the battery from being exploded. At this point, since electrolyte is also exhausted together with the internal gas, the chemical reaction within the battery is completely stopped.

Preferably, the thickness of the safety valve 30a is designed such that it can be broken at a pressure of 18~24 kgf/cm².

Figure 5:
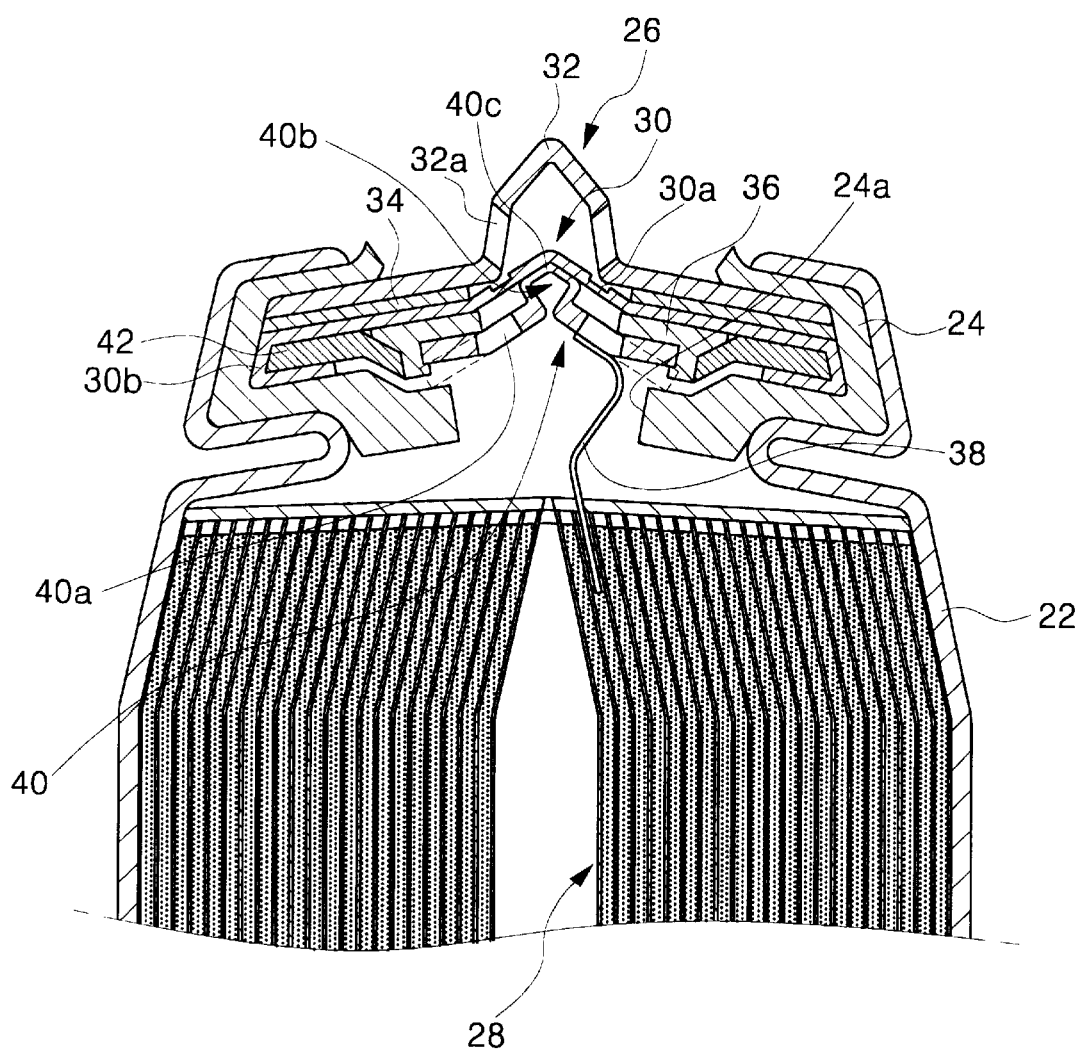
FIG. 5 is a sectional view illustrating a deformed state of a sealed battery according to a preferred embodiment of the present invention.

FIG. 5 shows another effect of a sealed battery according to the present invention. In the drawing, the battery is deformed by outer shock. As shown in the drawing, the cap assembly 26 is deformed in the form of a Λ-shape. At this point, since the projection 40b of the fixing plate 40 is intensively welded on the shape-variable plate 30, the projection 40b is displaced upward.

In addition, the insulating gasket 24 is provided with a reinforcing member 24a extending toward a center of the battery under the fixing plate 40. The reinforcing member prevents the edge of the fixing plate 40 from being displaced toward the electric generator 28 when the battery is deformed as shown in FIG. 5, thereby preventing a short-circuit between the fixing plate 40 and the electric generator 28. The inner diameter of the reinforcing member 24a is less than the outer diameter of the fixing plate 40.

Figure 6:
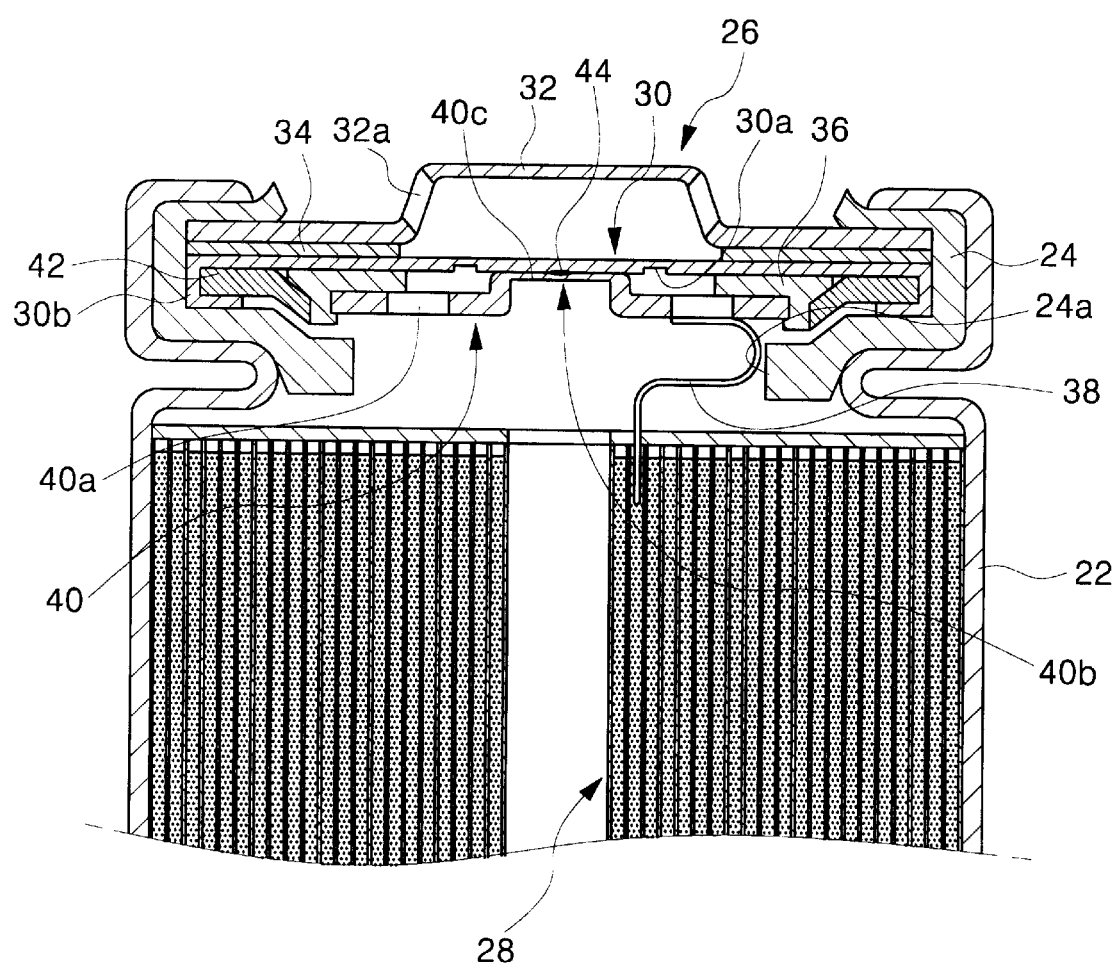
FIG. 6 is a sectional view of a sealed battery according to another preferred embodiment of the present invention.

FIG. 6 shows a sealed battery according to another embodiment of the present invention.

The sealed battery of this embodiment is the same as the above-described embodiment except that a safety valve 30a is formed at the lower portion where the internal pressure is directly applied so that the breaking operation is reliably achieved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sealed battery comprising:
   a can for receiving an electrical generator;
   a shape-variable plate being deformed in a direction where an internal pressure is applied and crimped on an opening of the can;
   a gasket disposed between the can and the shape-variable plate;
   a fixing plate having at least one air flow hole, and disposed under the shape-variable plate wherein an inner diameter of the gasket is less than an outer diameter of the fixing plate;
   an insulating member disposed between the shape-variable plate and the fixing plate; and
   a projection comprising a connection portion and a weld contact portion, the connection portion extending from the fixing plate to the weld contact portion, the weld contact portion having a uniform thickness being welded to the shape-variable plate, the projection being provided with a mechanically weak portion which is designed to be broken at an internal pressure lower than that for separating a welding portion of the projection and the shape-variable plate, wherein the mechanically weak portion consists of the weld contact portion.

2. A sealed battery of claim 1 wherein a thickness of the mechanically weak portion is less than those of the shape-variable plate and the fixing plate.

3. A sealed battery of claim 1 wherein the shape-variable plate is provided with a safety valve which is designed to be broken at an internal pressure higher than that for breaking the mechanically weak portion.

4. A sealed battery of claim 3, wherein the shape-variable plate comprises two layers attached to each other, and a portion of one of the layers is omitted to define the safety valve.

5. A sealed battery of claim 1 wherein the insulating member is fixed by a support ring.

6. A sealed battery comprising:

a can for receiving an electric generator;

a shape-variable plate crimped on an opening of the can;

a gasket disposed between the can and the shape-variable plate;

a fixing plate disposed under the shape-variable plate wherein an inner diameter of the gasket is less than an outer diameter of the fixing plate;

an insulating member disposed between the shape-variable plate and the fixing plate;

a projection comprising a connection portion and a weld contact portion, the connection portion extending from the fixing plate to the weld contact portion, the weld contact portion having a uniform thickness being welded to the shape-variable plate, the projection being provided with a mechanically weak portion which is designed to be broken at an internal pressure lower than that for separating a welding portion of the projection and the shape-variable plate, wherein the mechanically weak portion consists of the weld contact portion; wherein the mechanically weak portion cuts off a flow of a current by breaking the fixing plate; and means for exhausting an internal gas by breaking the shape-variable plate.

7. A sealed battery of claim 6 wherein a thickness of the mechanically weak portion is less than those of the shape-variable plate and the fixing plate.

8. A sealed battery of claim 6 wherein the means for exhausting comprises a safety valve formed on the shape-variable plate, the safety valve being designed to be broken at an internal pressure higher than that at which the mechanically weak portion is designed to be broken.

9. A sealed battery of claim 8, wherein the shape-variable plate comprises two layers attached to each other, and a portion of one of the layers is omitted to define the safety valve.

10. A sealed battery of claim 6 wherein the insulating member is fixed by a support ring.

* * * * *